United States Patent [19]

Buch et al.

[11] Patent Number: 4,567,972
[45] Date of Patent: Feb. 4, 1986

[54] CLUTCH WEAR DETECTOR, ADJUSTMENT AND INDICATOR SYSTEM

[75] Inventors: Yadu M. Buch, Shillington; Earl C. Smith, Jr., Mohnton, both of Pa.

[73] Assignee: Teledyne Mid-America Corporation, Los Angeles, Calif.

[21] Appl. No.: 568,652

[22] Filed: Jan. 6, 1984

[51] Int. Cl.$^4$ ............................................. F16D 66/02
[52] U.S. Cl. ................................. 192/30 W; 192/12 D; 192/84 C; 192/111 B; 116/208
[58] Field of Search ................... 192/30 W, 12 D, 34, 192/84 C, 110 R, 111 B; 116/208; 188/1.11

[56] References Cited

U.S. PATENT DOCUMENTS

| 1,258,115 | 3/1918 | Henderson | 192/30 W |
|---|---|---|---|
| 2,057,876 | 10/1936 | Berry | 192/30 W |
| 2,323,489 | 7/1943 | Schmidt et al. | 192/30 W |
| 3,086,631 | 4/1963 | Imperi | 192/111 B |
| 3,945,476 | 3/1976 | de Jong | 192/12 D |
| 3,982,614 | 9/1976 | Bisaillon | 116/208 |
| 4,135,612 | 1/1979 | Lengsfeld | 192/110 B |

FOREIGN PATENT DOCUMENTS

| 906927 | 8/1972 | Canada | 192/30 W |
|---|---|---|---|
| 1046421 | 12/1958 | Fed. Rep. of Germany | 192/30 W |
| 2362307 | 4/1978 | France | 192/30 W |
| 0054217 | 4/1979 | Japan | 192/30 W |
| 2088510 | 6/1982 | United Kingdom | 192/30 W |
| 2104982 | 3/1983 | United Kingdom | 192/30 W |

Primary Examiner—Craig R. Feinberg
Assistant Examiner—David A. Okonsky
Attorney, Agent, or Firm—Walter B. Udell

[57] ABSTRACT

A clutch system providing a simplified clutch adjustment which also gives an indication of how much clutch facing remains so that it is known when a clutch face needs replacement. The system mounts the motor armature and flywheel in a bearing structure which is axially shiftable toward the clutch face by utilization of a rotatable element threadedly engaged with the main frame of the motor and which presents against one end of the bearing structure so that it may shift the bearing structure and the entire armature and flywheel by rotation of the threaded element. This threaded element is coupled to the fan cowl of the motor which is in turn held in fixed position by a latching member. With the latching member released, the fan cowl is rotatable to adjust the flywheel, with the fan cowl then being again latched into position to prevent further movement of the flywheel in an axial direction. A color coded strip is affixed to the fan cowl, and by rotation past the latching member indicates how much of the clutch facing remains for further adjustment. An electrical contact is incorporated into the clutch magnet structure so that the contact is engaged by the clutch disc before the clutch disc can engage the clutch magnet structure. Upon engagement of the clutch disc with the electrical contact, an electrical circuit is completed which may be used to stop the motor or actuate an audible or visual alarm, or for any of a desired number of functions.

16 Claims, 5 Drawing Figures

FIG.3

CLUTCH WEAR DETECTOR, ADJUSTMENT AND INDICATOR SYSTEM

This invention relates generally to clutch motor structures, and more particularly to motors of the type having a continuously rotating armature and clutch and brake structures which work in alternation, to drive a work utility when the clutch is engaged and to brake the work utility when the clutch is released and the brake is applied.

The clutch structure utilizes a clutch magnet and a clutch disc, the magnet when energized pulling the clutch disc toward it. The clutch disc also carries a clutch facing which engages the flywheel of the continuously rotating motor when the clutch disc is attracted by the energized clutch magnet, the clutch facing and flywheel becoming engaged before the clutch disc can contact the clutch magnet structure. During usage, the clutch facing wears so that progressively the clutch disc moves closer and closer to the clutch magnet. If an adjustment is not made, after a period of time because of the wear in the clutch facing, the clutch disc will engage the clutch magnet structure with severe damage resulting to both the magnet and the clutch disc. Because of this, clutch motors are conventionally made with some means for adjusting the flywheel of the rotating motor so that it may be advanced toward the clutch facing on the clutch disc and prevent the clutch disc from contacting the clutch magnet structure.

Several problems however exist with regard to these structures, one of which is that in the past warning has not been provided when a damage condition is about to occur, and another of which is that such adjustments when made have in many cases been relatively complex and have required some substantial downtime of the work utility with which the motor is being utilized. This is a highly undesirable situation, since maintenance personnel are not always available to immediately make such an adjustment, and the work utility, as for example a sewing machine, can be out of operation for some considerable time with the consequent economic loss involved. Since the sewing machine operator is unwilling to lose income, the operator continues to run the machine under conditions where the clutch disc engages the clutch magnet, with consequent damage to the machine.

The clutch system according to the invention eliminates all of the foregoing problems by providing a simplified clutch adjustment which also gives an indication of how much clutch facing remains so that it is known when a clutch face needs replacement. Additionally, an alarm is provided to indicate that the clutch has worn to a point where it must be adjusted to avoid damage to the clutch disc and the clutch magnet structure. Consequently, the alarm avoids the damage problem, the clutch adjustment is quickly and simply made, and it is known exactly when a clutch face replacement is approaching.

This is accomplished by mounting the motor armature and flywheel in a bearing structure which is axially shiftable toward the clutch face by utilization of a rotatable element threadedly engaged with the main frame of the motor and which presents against one end of the bearing structure so that it may shift the bearing structure and the entire armature and flywheel by rotation of the threaded element. This threaded element is coupled to the fan cowl of the motor which is in turn held in fixed position by a latching member. With the latching member released, the fan cowl is rotatable to adjust the flywheel, with the fan cowl then being again latched into position to prevent further movement of the flywheel in an axial direction. A color coded strip is affixed to the fan cowl, and by rotation past the latching member indicates how much of the clutch facing remains for further adjustment.

Finally, an electrical contact is incorporated into the clutch magnet structure so that the contact is engaged by the clutch disc before the clutch disc can engage the clutch magnet structure. Upon engagement of the clutch disc with the electrical contact, an electrical circuit is completed which may be used for any of a desired number of functions. The electrical circuit can be utilized to stop the motor so that no damage can occur to the clutch structure, or it can be used to actuate an audible or visual alarm, or to provide an alarm while simultaneously stopping the rotation of the motor. Accordingly, it is a primary object of the invention to provide a novel clutch wear detector and adjustment system for clutch motors which provides means for determining that the clutch structure requires adjustment without the necessity to partially dismantle the motor.

Another object of the invention is to provide a novel clutch wear detector and adjustment system as aforesaid in which clutch adjustments can be made very quickly and simply without dismantling the motor.

A further object of the invention is to provide a novel clutch wear detector and adjustment system as aforesaid which provides an external indicator of the condition of the internal clutch face so that it is readily determinable when the clutch facing in the clutch structure requires replacement, without any need to dismantle the motor and examine the clutch itself.

The foregoing and other objects of the invention will become clear from a reading of the following specification in conjunction with an examination of the drawings, wherein.

In the several figures, like elements are denoted by like reference characters.

Figure 1:
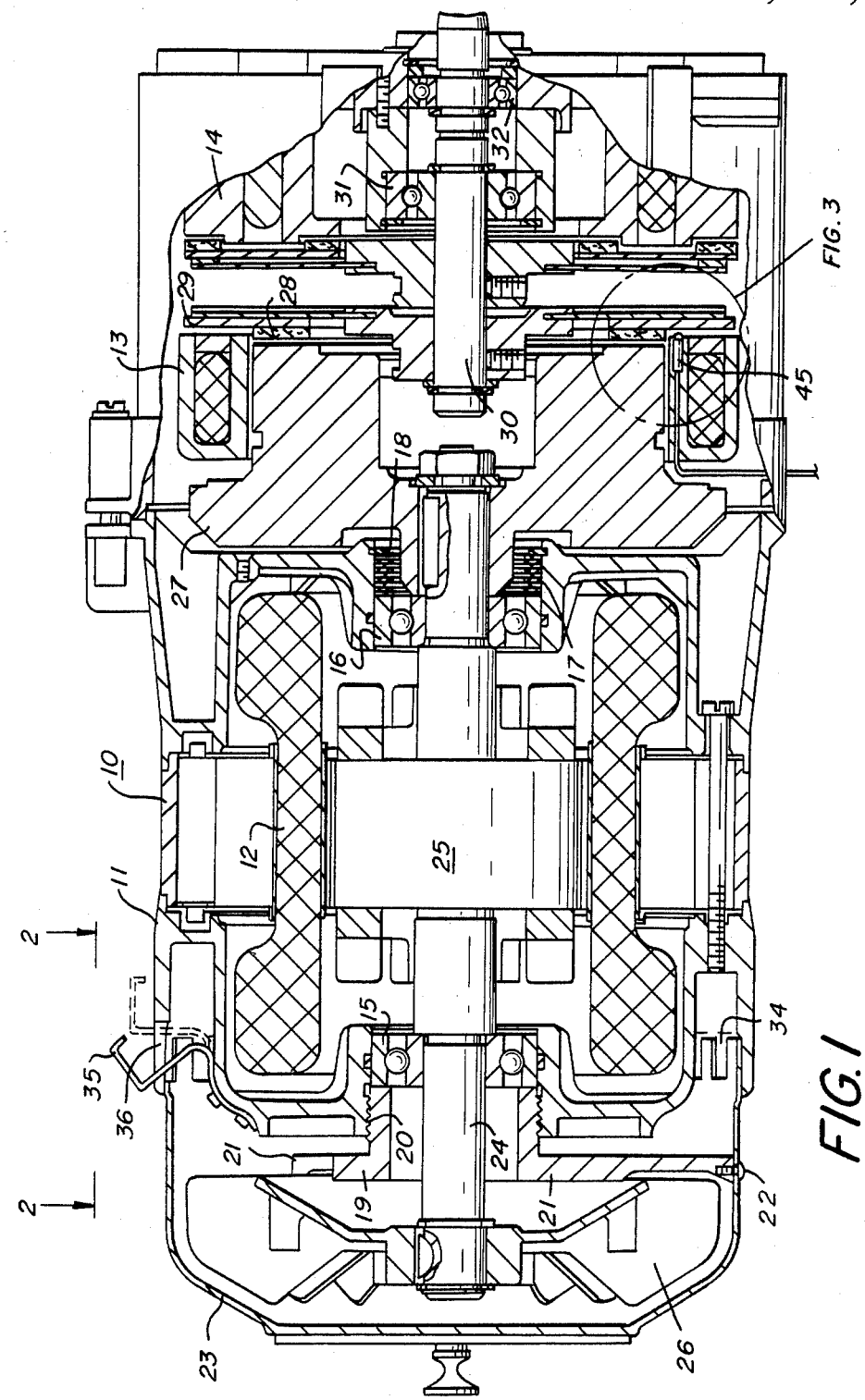
FIG. 1 is a longitudinal sectional view of a clutch motor constructed in accordance with the invention.

Turning now to the drawings there is seen in FIG. 1 a motor designated generally at 10 having a frame or casing 11 from which is internally supported the stator structure 12, a clutch magnet structure 13 and a brake magnet 14. A pair of ball bearings 15 and 16 have their outer races slidably mounted within interior projecting portions of the motor frame with the right end of the bearing 16 in engagement with a resiliently compressible element 17 retained from axial movement at its opposite end by a retaining ring 18. The left-hand end of the bearing 15 is borne against by the right end face of cylindrical hollow member 19 threaded on its outer face, as at 20, into a complementally threaded portion of the motor frame which also supports the outer race of the bearing 15. The hollow cylindrical threaded member 19 has three arms 21 projecting radially outward therefrom and secured as by machine screws 22 to the fan cowl housing 23, so that rotation of the fan cowl housing 23 rotates the hollow threaded member 19 and causes it to press axially on the bearing 15 to move it toward the right.

The inner races of the ball bearings 15 and 16 are fixed upon a motor shaft 24 upon which is mounted the motor armature 25, a motor fan 26 within the housing 23, and a flywheel 27. The shaft 24, armature 25, fan 26 and flywheel 27 are fixedly interconnected so that movement of the bearing 15 to the right because of pressure exerted upon it by the member 19 causes this entire structure to move to the right, so that the right-hand face of the flywheel 27 may be axially moved toward the right to more closely approach the facing 28 mounted on the left-hand face of the clutch disc 29, which latter is fixedly mounted for rotation upon shaft 30. The shaft 30 is journalled for rotation in bearings 31 and 32, and has no axial movement. The structure of the clutch disc is such that when the clutch magnet 13 is energized, the clutch disc flexes in an axial direction toward the clutch magnet, simultaneously of course carrying the clutch facing 28 into engagement with the right-hand face of the flywheel 27, such engagement occurring while there is still clear space between the apposed faces of the clutch disc 29 and the clutch magnet 13. This is shown most clearly at 33 in the showing of FIG. 3.

Figure 2:
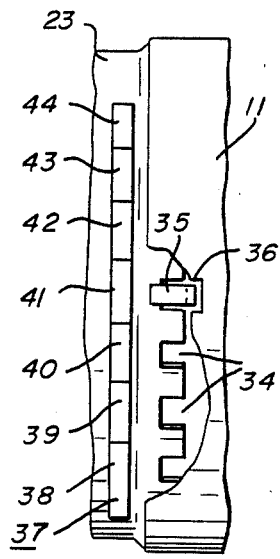
FIG. 2 is an enlarged fragmentary view of a portion of the motor according to the invention in the region of the adjustment latching structure and wear indicator, as would be seen when viewed along the line 2—2 of FIG. 1.

As best seen in FIGS. 1 and 2, the right-hand margin of the fan cowl housing 23 is provided with a series of slots extending from the right-hand edge of the housing toward the left, these slots being designated generally as 34. Secured to the motor frame is a spring latch 35 illustrated as projecting outward through one of the slots 34 in the fan cowl housing and outward through a slot 36 formed through the motor casing. It should be noted that the depth of the slot 36 is sufficient so that the spring latch 35 can be moved to the right to clear the end of the fan cowl housing 23 and permit that housing to be rotated. Additionally, the width of the spring latch 35 is substantially equal to the width of a slot 34 so that when the latch 35 is engaged within a slot 34 there is no tendency for the fan cowl housing 23 to rotate due to vibration. Accordingly, the clutch adjustment, once made, does not tend to slip in either direction.

As best seen in FIG. 2, there is affixed to the outer surface of the fan cowl housing 23 a coded indicator strip 37 adhered to or painted for a distance around the perimeter of the fan cowl housing 23. The segments 38 through 44 of the coded indicator strip could be for example, in sequence, dark green at 38, medium green at 39, light green at 40, yellow at 41, light orange at 42, dark orange at 43 and red at 44. The dark green patch 38 might cover for example the length of two slots 34 in the housing 23, while the rest of the patches 39 through 44 would each correspond to one additional housing slot 34. When the clutch is completely new, the patch 38 on the indicator strip 37 would lie directly opposite the latch 35. As the clutch is progressively adjusted, the fan cowl housing 23 is successively rotated a slot at a time so that the other color patches progressively are presented opposite the latch 35 until such time as the red patch 44 appears opposite the latch 35. At this point it is known that there is no further clutch adjustment available and that the clutch facing must be replaced in order to avoid damage to the clutch structure. The intermediate colors between dark green and red indicate the progressive wear of the clutch face 28 and show just what percentage of the usable clutch face remains.

Figure 3:
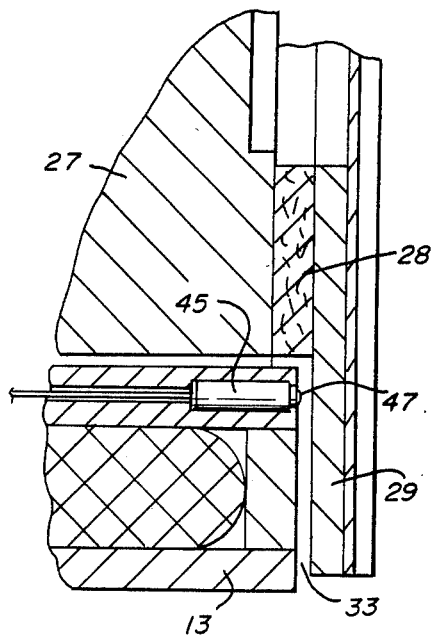
FIG. 3 is an enlarged fragmentary view of the portion of the motor shown in FIG. 1 which includes the clutch face wear detector structure, as would be seen within the phantom circle 3 on FIG. 1.
Figure 4:
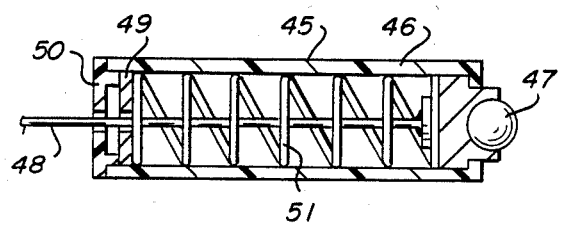
FIG. 4 is an enlarged longitudinal sectional view of the wear detector contact structure, shown in elevation in FIGS. 1 and 3.

Of course, the coded indicator strip by itself only indicates what portion of the clutch facing remains under conditions where there has not been engagement of the clutch disc 29 with the clutch magnet structure 13, and the coded indicator strip will not of itself prevent damage to the clutch structure. In order to avoid damage to the clutch structure and to be warned that a clutch adjustment is required, an alarm circuit is incorporated into the motor structure. This is seen generally in FIG. 1, and more specifically in FIGS. 3, 4 and 5. As best seen in FIG. 3, a contact assembly 45 is physically fixedly mounted in the clutch magnet assembly 13 and consists of an insulating sleeve 46 within which is disposed a metallic ball bearing contact 47 to the rear face of which is connected an insulated conductor 48 which extends through the insulating sleeve 46 and through an aperture in a washer 49 and a retaining plug 50 to emerge outward through the motor casing for connection to an electrical control circuit. Disposed within the insulating sleeve 46 is a compression spring 51 which biases the ball bearing contact 47 to the right.

Figure 5:
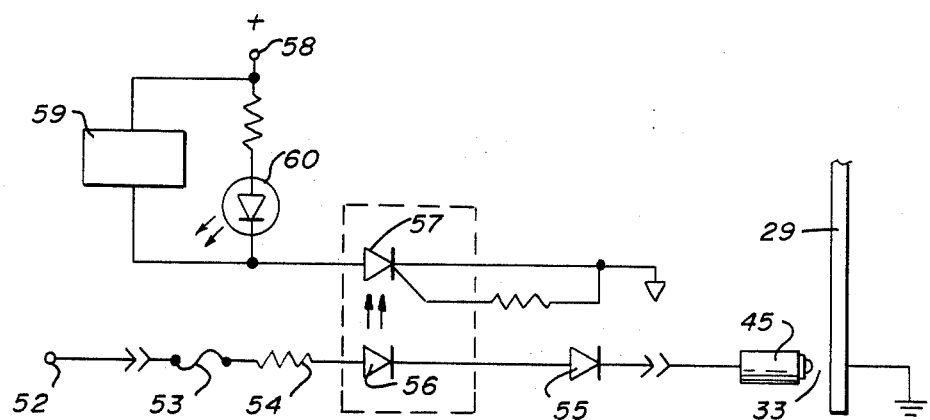
FIG. 5 is a schematic diagram of a typical alarming circuit utilizable in conjunction with the wear detector contact shown in FIGS. 1, 3 and 4.

As best seen in the showing of FIG. 3, continuous clutching and declutching of the mechanism will eventually cause the clutch face 28 to wear so that the clearance 33 between the clutch disc 29 and clutch magnet 13 will reduce to the point where the face of the clutch disc 29 will contact the ball bearing contact 47. Since the clutch disc 29 is mechanically and electrically connected to the shaft 30, which is itself electrically grounded to the motor frame, an electrical circuit will be completed as shown in FIG. 5 to be subsequently described. If the clutch adjustment is not made at this time, the clutch disc 29 will continue to gradually move to the left, and it is therefore necessary to have the ball bearing contact 47 resiliently mounted so that it can move with the movement of the clutch disc. After the clutch adjustment has been made, the clutch disc 29 will of course be again displaced to the right and out of contact with the ball bearing contact 47 which latter is resiliently restored to its initial position by the spring 51.

Ths use of a soft non-resiliently mounted contact, such as a carbon brush, in place of the ball bearing contact 47, would permit wear of the brush so that its contact surface would progressively be moved closer and closer to the face of the clutch magnet 13 until ultimately the clutch disc 29 would contact the clutch magnet 13 at the same time that it contacted the soft brush. Consequently, the alarm system would be of no value whatever. The utilization of the non-wearing resiliently mounted contact avoids this problem.

FIG. 5 illustrates one type of control circuit that could be used to actuate a clutch wear alarm or to shut the apparatus down. The circuit includes, in schematic form, the clutch disc 29 which is grounded to the motor frame, the contact assembly 45 spaced from the clutch disc by the gap 33, and a source of potential, as for example 110 volts A.C. applied at the terminal 52, the potential being coupled to the contact assembly 45 through a fuse 53, a resistor 54, a diode 55 and the opto-isolator LED 56. The opto-isolator LED 56 when energized by current flow therethrough produces a light output signal which is coupled to the opto-isolator SCR 57 which is normally non-conductive so that no current flows from the positive potential source at terminal 58 through either the work circuit 59 or the LED indicator 60. When however the opto-isolator LED 56 is activated by contact between the clutch disc 29 and the contact assembly 45, the opto-isolator SCR is rendered conductive which effectively pulls its anode down to circuit ground potential and permits current flow from the terminal 58 through the indicator LED 60 to give a visual alarm that clutch adjustment must be made, and also to activate the work circuit 59 which may take any desired form, as for example an audible alarm or interruption of the power to the clutch motor. The opto-isolator LED 56 and SCR 57 are available from the General Electric Company as an 11C3 package. The other components are of course commonly available.

Having now described our invention in conjunction with a particularly illustrated embodiment thereof, it will be appreciated that modifications and variations of the invention may now naturally occur from time to time to those persons normally skilled in the art without departing from the essential scope or spirit of the invention, and accordingly it is intended to claim the same broadly as well as specifically as indicated by the appended claims.

We claim:

1. Clutch wear detector and adjustment apparatus for use in conjunction with a mechanical power drive supported for rotational drive about an axis of rotation and being shiftable longitudinally along the rotational axis and in which the power drive has a planar clutching surface oriented orthogonally to the rotational axis of the power drive, a rotatable power transmitter for transmitting rotational power from the power drive to a work utility in which the power transmitter has a wearable clutch means of predetermined thickness and a planar wearable clutching face disposed in a plane substantially parallel to the clutching surface of the power drive and is rotatable about an axis coincident with the axis of rotation of the power drive and has a magnetically responsive structure effective when subjected to a magnetic field to move the clutching face of the power transmitter into clutching engagement with the clutching surface of the power drive, means for controllably shifting the power drive in at least one direction longitudinally along the rotational axis of the power drive to thereby shift the planar position of the power drive clutching surface toward the power transmitter clutching face, magnetic field producing means positioned adjacent to the magnetically responsive structure of the power transmitter and effective when energized to subject the latter to a magnetic field to move the power transmitter clutching face into clutching engagement with the power drive clutching surface, the improvement comprising, power transmitter clutch means wear indicator means which indicates at all times how much of the usable clutch thickness remains and indicates when the clutch means thickness has been reduced by an amount requiring replacement of the clutch means to avoid damage to the power transmitter and power drive.

2. Apparatus as described in claim 1 wherein said power drive shifting means includes an externally accessible hand graspable movable means, and a releasable latching means effective when not released to latch said power drive shifting means in a desired position and effective when released to permit said power drive shifting means to be moved relatively to said latch to shift said power drive to adjust the clutch, and wherein said clutch wear indicator means comprises markings which are successively moved into registration with an index location as said movable means is moved, one of said markings designating that the limit of adjustment has been reached.

3. Apparatus as described in claim 2 wherein said hand graspable movable means is a rotatable means which has a surface that rotates past said latching means, wherein said latching means functions as said index, and wherein said markings are on that portion of the surface of said rotatable means that is rotatable past said latching means.

4. Apparatus as described in claim 2 wherein the device in conjunction with which said clutch wear detector and adjustment apparatus is used as an electrical clutch motor having an armature, flywheel and cooling fan fixedly mounted to for rotation with a shaft set in bearings shiftable axially along the rotational axis of said shaft, having a motor casing and having a motor frame holding the shiftable bearings, and wherein said hand graspable movable means is a rotatable cylindrical fan cowl housing fixedly coupled to a hollow cylindrical member threadedly engaged with the motor frame and which bears against a shaft bearing, said fan cowl housing having a series of adjacent slots spaced around at least a part of its periphery, said latching means being fixed to the motor frame and extending outward through a slot in said fan cowl housing and a slot in the motor casing.

5. Apparatus as described in claim 4 wherein said latching means functions as said index and wherein said markings are on that portion of the surface of said fan cowl housing that is rotatable past said latching means.

6. Apparatus as described in claim 4 wherein said latching means functions as said index and wherein said markings are on that portion of the surface of said fan cowl housing that is rotatable past said latching means, said markings corresponding to said slots spaced around said fan cowl housing.

7. Apparatus as described in claim 6 wherein said markings are color coded to distinguish adjacent ones from one another.

8. Apparatus as set forth in claim 1 further including monitor means effective to detect mechanical approach of the said magnetically responsive structure of the power transmitter clutch means to the said magnetic field producing means when such approach reduces the space therebetween to a predetermined distance.

9. Apparatus as set forth in claim 8 wherein said monitor means comprises an alarm circuit including an electrical contact engagable by said magnetically responsive structure of said power transmitter clutch means when said magnetic field producing means is energized.

10. Apparatus as set forth in claim 8 wherein said monitor means comprises an alarm circuit including a non-wearing electrical contact engagable by said magnetically responsive structure of said power transmitter clutch means when said magnetic field producing means is energized.

11. Apparatus as set forth in claim 8 wherein said monitor means comprises an alarm circuit including a non-wearing resiliently biased electrical contact engagable by said magnetically responsive structure of said power transmitter clutch means when said magnetic field producing means is energized.

12. Apparatus as described in claim 8 wherein said power drive shifting means includes an externally accessible hand graspable movable means, and a releasable latching means effective when not released to latch said power drive shifting means in a desired position and effective when released to permit said power drive shifting means to be moved relatively to said latch to shift said power drive to adjust the clutch, and wherein said clutch wear indicator means comprises markings which are successively moved into registration with an index location as said movable means is moved, one of said markings designating that the limit of adjustment has been reached.

13. Apparatus as described in claim 12 wherein the device in conjunction with which said clutch wear detector and adjustment apparatus is used is an electrical clutch motor having an armature, flywheel and cooling fan fixedly mounted to for rotation with a shaft set in bearings shiftable axially along the rotational axis of said shaft, having a motor casing and having a motor frame holding the shiftable bearings, and wherein said hand graspable movable means is a rotatable cylindrical fan cowl housing fixedly coupled to a hollow cylindrical member threadedly engaged with the motor frame and which bears against a shaft bearing, said fan cowl housing having a series of adjacent slots spaced around at least a part of its periphery, said latching means being fixed to the motor frame and extending outward through a slot in said fan cowl housing and a slot in the motor casing.

14. Apparatus as described in claim 13 wherein said latching means functions as said index and wherein said markings are on that portion of the surface of said fan cowl housing that is rotatable past said latching means.

15. Apparatus as described in claim 13 wherein said latching means functions as said index and wherein said markings are on that portion of the surface of said fan cowl housing that is rotatable past said latching means, said markings corresponding to said slots spaced around said fan cowl housing.

16. Apparatus as described in claim 15 wherein said markings are color coded to distinguish adjacent ones from one another.

* * * * *